United States Patent [19]
Trubiano

[11] 3,909,034
[45] Sept. 30, 1975

[54] HOOK MEANS FOR SHOPPING CART

[76] Inventor: Antoine Trubiano, 36 Marien St., Montreal East 550, Quebec, Canada

[22] Filed: Mar. 18, 1974

[21] Appl. No.: 452,114

[52] U.S. Cl. ............... 280/47.34; 248/73; 248/216; 280/33.99 A; 280/DIG. 4
[51] Int. Cl.² ........................................... B62B 3/02
[58] Field of Search..... 280/33.99 R, 33.99 A, 79.3, 280/DIG. 4, 47.34; 248/73, 216, 223, 303, 302

[56] References Cited
UNITED STATES PATENTS

| | | | |
|---|---|---|---|
| 1,626,333 | 4/1927 | Fain et al. | 248/216 X |
| 2,443,236 | 6/1948 | Gallagher | 280/79.3 X |
| 2,761,644 | 9/1956 | Capocci | 248/303 |
| 3,031,161 | 4/1962 | Hawie | 248/223 |
| 3,438,644 | 4/1969 | McMillan et al. | 280/33.99 A |
| 3,721,412 | 3/1973 | Kindorf | 248/73 |

OTHER PUBLICATIONS

Western Electric, Technical Digest No. 32, Oct. 1973, pp. 7, 8; Balls, et al.

Primary Examiner—David Schonberg
Assistant Examiner—Michael J. Forman

[57] ABSTRACT

A shopping cart comprising a frame supporting a container thereon. The frame is supported on casters for displacing the container. The container is defined by a bottom wall, side walls, a front and a rear wall, and an open upper end. A handle is supported rearwardly of the container rear wall for displacing the cart on the wheels. Hook means are secured rearwardly of the container rear wall for supporting articles from the upper area of the cart and without interference with the container.

7 Claims, 4 Drawing Figures

U.S. Patent  Sept. 30,1975  3,909,034
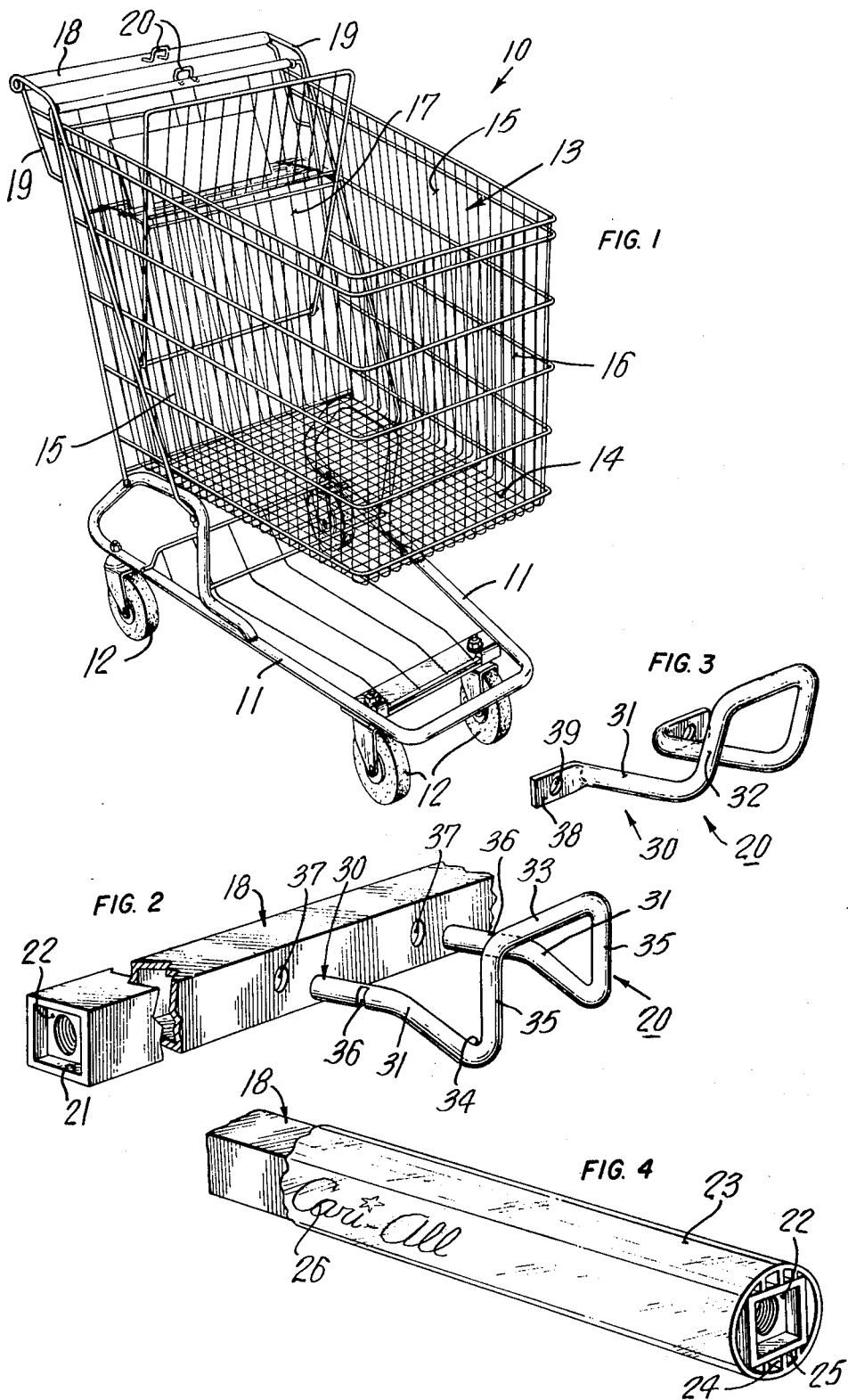

HOOK MEANS FOR SHOPPING CART

BACKGROUND OF INVENTION a. Field of the Invention

This invention relates to improvements in shopping carts of the type which is utilized by persons for carrying goods as they are purchased in a shopping area such as grocery stores, shopping centers, etc. More particularly, the invention is concerned with hook means for supporting additional articles outwardly of the container portion of the shopping cart.

b. Description of Prior Art

Shopping carts are now commonly used in shopping centers for carrying non-grocery products such as clothing and household supplies. Because such non-grocery items are most often bulky or of irregular shape, these are not readily transportable in the container compartment of the shopping cart. For example, articles of clothing may be creased or damaged by other goods if placed in the container compartment of the cart. Still further, when persons are shopping in shopping centers, they normally purchase non-grocery items before doing their grocery purchases. These non-grocery items are normally carried in bags provided by the various stores that they have been purchased in. It is often necessary to carry these bags whilst doing the grocery shopping. A disadvantage of this is that these bags or other purchased items often cause an inconvenience in that they occupy a large portion of the shopping cart container.

SUMMARY OF INVENTION

It is a feature of the present invention to provide hook means for supporting such articles from the upper area of a shopping cart without interference with the container portion of the cart.

According to this feature, from a broad aspect, the present invention provides a shopping cart comprising a frame supporting a container thereon. The frame is supported on casters for displacing the container. The container is defined by a bottom wall, side walls, a front and a rear wall, and an open upper end. A handle is supported rearwardly of the container rear wall for displacing the cart on the wheels. Hook means are secured rearwardly of the container rear wall for supporting articles from the upper area of the cart and without interference with the container.

BRIEF DESCRIPTION OF DRAWINGS

The invention will now be described with reference to a preferred embodiment as illustrated by the following drawings, in which:

FIG. 1 is a perspective view of a shopping cart utilizing the hook means of the present invention;

FIG. 2 is a fragmented perspective view of the handle of the shopping cart showing a first embodiment of a hook member;

FIG. 3 is a perspective view of a further hook member; and

FIG. 4 is a perspective view of the handle construction showing a further feature of the present invention.

DESCRIPTION OF PREFERRED EMBODIMENTS

Referring now to the drawings, and more particularly to FIGS. 1 to 3, there is shown generally at 10, a shopping cart construction as is commonly known in the art. The shopping cart comprises a frame 11 which is supported on casters 12. A container 13 is secured to the frame 11 and comprises a bottom wall 14, side walls 15, a front wall 16, and a rear wall 17. The upper end of the container 13 is open to permit the placement of articles in the container. A handle 18 is supported rearwardly of the container rear wall by a handle support frame 19. The handle 18 provides for the cart to be pushed and steered on the casters 12. Hook means or hook members 20 are secured rearwardly of the container rear wall 17 for supporting articles from the upper area of the cart and without interference with the container 13.

In FIG. 1, there is shown two hook members 20, one secured to the handle 18 and the other secured to the rear wall 17. However, it may be necessary to provide only one of these hook members in any one of the positions as shown in FIG. 1. Furthermore, the hook member 20 secured to the handle 18, may extend outwardly of the handle, that is, away from the rear wall 17 of the container 13. Also, as shown in FIG. 1, these hook members extend substantially along a horizontal plane or may be slightly elevated therefrom.

FIG. 2 shows one embodiment of a hook member 20 secured to the handle 18. Hereinshown, the handle consists of a tubular member 21 of substantially square transverse cross-section and having a threaded element 22, such as a threaded nut, secured adjacent each end of the tubular member whereby the handle 18 may be secured between the handle support frames 19 by means of a bolt, not shown, threaded from the outside of the frame 19 and into the nut 22. As shown in FIG. 2, the tubular member 21 is encased in a plastic covering 23 which is a circular hollow member, to provide a smoother outer surface and to protect the tubular member 21. The tube 23 is formed with opposed longitudinal ridges 24 projecting inwardly from the inner surface thereof to abut against an opposed side wall 25 of the tubular member 21. This prevents the plastic cover 23 from rotating about the tubular member 21. As can be seen from FIG. 4, printed matter 26 may be provided on the tubular member 21 for advertising purposes. In such an application, the plastic covering is of transparent plastic whereby the advertising material can be read. The plastic covering 23 would also protect this printed matter.

Referring now more specifically to FIGS. 2 and 3, there is shown two embodiments of the construction of the hook member 20 of the present invention. Hereinshown, the hook member 20 is a substantially U-shaped member defining two substantially parallel projection arms 31 each having a securable end 30 and a transverse interconnecting arm 33. A portion of the free end of the projection arms 31 is upwardly turned to provide stop means so that the interconnecting arm 33 lies above the projection arms.

As shown in FIG. 2, the projection arms 31 are substantially straight along a first portion thereof and then curve downwardly along a second portion to the upwardly turned portion to form a V-notch 34, between the second portion of the arm and the upwardly turned portion 35. This V-notch provides more stability in supporting articles which are normally contained on wire hangers as the hanger would be supported in the notch preventing the hanger from displacement on the arms 31. A transverse groove 36 is provided at the securable end 30 of each arm. The groove from each arm is substantially in alignment with one another. Also, the hook member 20 is constructed of a metallic material which will retain its initial shape when slightly distorted under pressure. To secure the member 20 to the handle 18, there is provided two aligned holes 37 in this handle. The spacing between the holes is slightly smaller than the spacing between the arms 31. Thus, to secure the hook member 20 to the handle, the securable ends of the arms are brought closer together by maintaining inward pressure on both arms and the securable ends are positioned in a respective hole 37 whereby opposite portions of the circumferential edge of the holes 37 are received in a respective one of the grooves 36, when the pressure between the arms 31 is released with the grooves aligned with the circumferential edges.

In the embodiment of the hook member 20 as shown in FIG. 3, the arms 31 are substantially parallel to each other and are straight throughout their entire length. An outwardly extending transverse flange 38 is formed integrally at the securable end 30 of the arms 31. A hole 39 is provided in each flange to accommodate suitable securing means, such as a bolt or rivet, for fastening the hook member 30 to the handle 18. As shown in FIG. 2, the plastic covering 23 is also provided with a hole in alignment with the holes 37 to permit insertion of the securable ends of the hook member therethrough.

Referring to FIG. 1, there is shown a still further embodiment of the hook member 20 in that arrangement where the hook member is secured to the rear wall 17 of the container 13. As shown, the securable end 31 of the hook member 20 is formed integrally with the rear wall 17 of the container. These containers are normally constructed of heavy wires and by shaping an elongated U-shaped wire in the form of a hook, the hook can be provided in the construction of the rear wall 17 with the projection arms 31 extending rearwardly and substantially centrally from the upper edge of the rear wall.

Although the embodiments of the hook member 30 described hereinabove all include members formed of generally U-shape, it is within the ambit of the present invention to provide a single projection arm having an upwardly turned outer end and a connectable end.

I claim:

1. A shopping cart comprising a frame supporting a container thereon, said frame being supported on casters for displacing said container; said container being defined by a bottom wall, side walls, a front and rear wall, and an open upper end; a handle consisting of a bar-like member supported rearwardly and above said container rear wall for displacing said cart on said wheels; and a hook member having a securable end, a projection arm and stop means at the free end of said projection arm; said hook member securable end being connected to said bar-like member and projecting inwardly towards said container rear wall whereby articles secured to said projection arm will hang between said handle and said container rear wall and from an uppermost portion of said cart to provide maximum distance between said hook member and the floor for hanging depending articles thereon.

2. A shopping cart as claimed in claim 1 wherein said hook member is a U-shaped member defining two substantially parallel projection arms each having a securable end and a transverse interconnecting arm at their free end, said arms having a portion of their free end upwardly turned so that said interconnecting arm lies above said projection arms whereby said upwardly turned portion constitutes said stop means.

3. A shopping cart as claimed in claim 2 wherein said projecting arms are substantially straight along a first portion thereof from their securable end and then curve downwardly along a second portion to said upwardly turned portion to form a V-notch between said second portion of said arms and said upwardly turned portion.

4. A shopping cart as claimed in claim 2 wherein said securable end of each said projection arms comprise a transverse groove extending into said arm and having an open end on the outer edge of said arm, said grooves being in alignment with one another, said arms being spaced apart a distance slightly longer towards the securable end thereof, said bar-like member being a hollow tube having two holes therein defining a narrow circumferential edge, said securable ends of said arms being brought closer together at said securable end by maintaining inward pressure on both said arms, said securable ends being positioned in a respective hole of said handle whereby opposite portions of said circumferential edges are received in a respective one of said grooves in said arms when said pressure between said arms is released with said grooves aligned with said circumferential edge.

5. A shopping cart as claimed in claim 2 wherein said securable end of each said projection arms is provided with an outwardly extending transverse flange, a hole in said flange to accommodate suitable securing means for fastening said hook member to said handle.

6. A shopping cart as claimed in claim 1 wherein said handle is an elongated tubular member secured at its ends to a handle support frame extending rearwardly from the upper end of said container rear wall, and a transparent plastic material covering at least a portion of said handle.

7. A shopping cart as claimed in claim 6 wherein printed matter is provided on said handle, said transparent plastic covering said printed matter to protect same.

* * * * *